United States Patent
Komarov et al.

(10) Patent No.: US 9,652,270 B2
(45) Date of Patent: May 16, 2017

(54) APPARATUS AND METHOD FOR VIRTUALIZED COMPUTING

(71) Applicant: INTEL CORPORATION, Santa Clara, CA (US)

(72) Inventors: Alexander Komarov, Munich (DE); Anton Langebner, Salzburg (AT)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 14/222,416

(22) Filed: Mar. 21, 2014

(65) Prior Publication Data

US 2015/0268979 A1    Sep. 24, 2015

(51) Int. Cl.
| | | |
|---|---|---|
| *G06F 9/455* | (2006.01) | |
| *G06F 12/08* | (2016.01) | |
| *G06F 12/126* | (2016.01) | |
| *G06F 12/0808* | (2016.01) | |

(52) U.S. Cl.
CPC ...... *G06F 9/45533* (2013.01); *G06F 9/45558* (2013.01); *G06F 12/126* (2013.01); *G06F 12/0808* (2013.01); *G06F 2009/45583* (2013.01); *G06F 2212/621* (2013.01)

(58) Field of Classification Search
None
See application file for complete search history.

(56) References Cited

U.S. PATENT DOCUMENTS

| | | | |
|---|---|---|---|
| 6,490,615 B1 * | 12/2002 | Dias | H04L 67/1008 709/203 |
| 8,041,896 B2 * | 10/2011 | Bonola | G06F 9/30047 711/133 |
| 8,156,298 B1 * | 4/2012 | Stubblefield | G06F 12/1433 711/163 |
| 2010/0070678 A1 | 3/2010 | Zhang et al. | |
| 2010/0250866 A1 | 9/2010 | Kojima et al. | |
| 2010/0299673 A1 | 11/2010 | Shultz et al. | |
| 2012/0233378 A1 | 9/2012 | Elteto | |

(Continued)

FOREIGN PATENT DOCUMENTS

CN    102402422 A  *  4/2012  ............... G06F 9/34

OTHER PUBLICATIONS

International Search Report and Written Opinion mailed May 1, 2015 for International Application No. PCT/US2015/012728, 10 pages.

(Continued)

*Primary Examiner* — Midys Rojas
*Assistant Examiner* — Masud Khan
(74) *Attorney, Agent, or Firm* — Schwabe, Williamson & Wyatt, P.C.

(57) ABSTRACT

Embodiments of apparatus and methods for virtualized computing are described. In embodiments, an apparatus may include one or more processor cores and a cache coupled to the one or more processor cores. The apparatus may further include a hypervisor operated by the one or more processor cores to manage operation of virtual machines on the apparatus, including selecting a part of the cache to store selected data or code of the hypervisor or one of the virtual machines, and locking the part of the cache to prevent the selected data or code from being evicted from the cache. Other embodiments may be described and/or claimed.

23 Claims, 5 Drawing Sheets

(56) References Cited

U.S. PATENT DOCUMENTS

2012/0291021 A1* 11/2012 Banerjee ................ G06F 8/665
717/173
2013/0086329 A1    4/2013 Comparan et al.
2013/0326179 A1* 12/2013 Tsirkin ..................... G06F 9/46
711/163
2014/0344550 A1* 11/2014 Kruglick .............. G06F 9/5044
712/30

OTHER PUBLICATIONS

International Preliminary Report on Patentability mailed Sep. 29, 2016 for International Application No. PCT/US2015/012728, 7 pages.

* cited by examiner

310 ↘

| | DDIO | DDIO | | | | | | | | | | | | | |
|---|---|---|---|---|---|---|---|---|---|---|---|---|---|---|---|
| CQoS Class | 0 | 0 | 1 | 1 | 1 | 1 | 1 | 1 | 1 | 1 | 1 | 0 | 0 | 0 | 0 |

320 ↘

| | DDIO | DDIO | | | | | | | | | | | | | |
|---|---|---|---|---|---|---|---|---|---|---|---|---|---|---|---|
| CQoS Class | 0 | 0 | 0 | 0 | 0 | 0 | 0 | 0 | 0 | 1 | 1 | 0 | 0 | 0 | 0 |

FIG. 3

APPARATUS AND METHOD FOR VIRTUALIZED COMPUTING

FIELD OF THE INVENTION

The present disclosure relates generally to the technical field of computing, and more particularly, but not exclusively, to apparatuses and methods for virtualized computing.

BACKGROUND

The background description provided herein is for generally presenting the context of the disclosure. Unless otherwise indicated herein, the materials described in this section are not prior art to the claims in this application and are not admitted to be prior art or suggestions of the prior art, by inclusion in this section.

Computer virtualization includes the virtualization of computer hardware. From the perspective of a user, computer virtualization may provide an abstract computing platform, e.g., a virtual machine (VM), for executing a set of programs independent of execution of other sets of programs or other abstract computing platforms, while sharing the underlying hardware. Typically, each VM has its own operating system, which might be the same or different from other VMs' operating systems. Virtualization may be controlled by a hypervisor, also known as a virtual machine monitor (VMM).

Jitter may occur in VM exit or VM entry times. When a VM exit occurs, some of the hypervisor's data or code may have to be fetched from the main memory. Similarly, on the other side, when the hypervisor returns control to the VM (e.g., after a VM entry), some of the VM's data or code may have to be fetched from the main memory. The effect of jitter may become more severe in a multi-core execution scenario, where the cores may evict data or code from each other's cache or shared cache. Jitter may become a serious issue for workload consolidation when two systems try to run independently on a single or multi-core system, e.g., when running real-time operating systems and general purpose operating systems on the same multi-core processor.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 3 is a schematic diagram illustrating cache quality of services classes, which may be practiced by an example apparatus, incorporating aspects of the present disclosure, in accordance with various embodiments.

DETAILED DESCRIPTION

Figure 1:
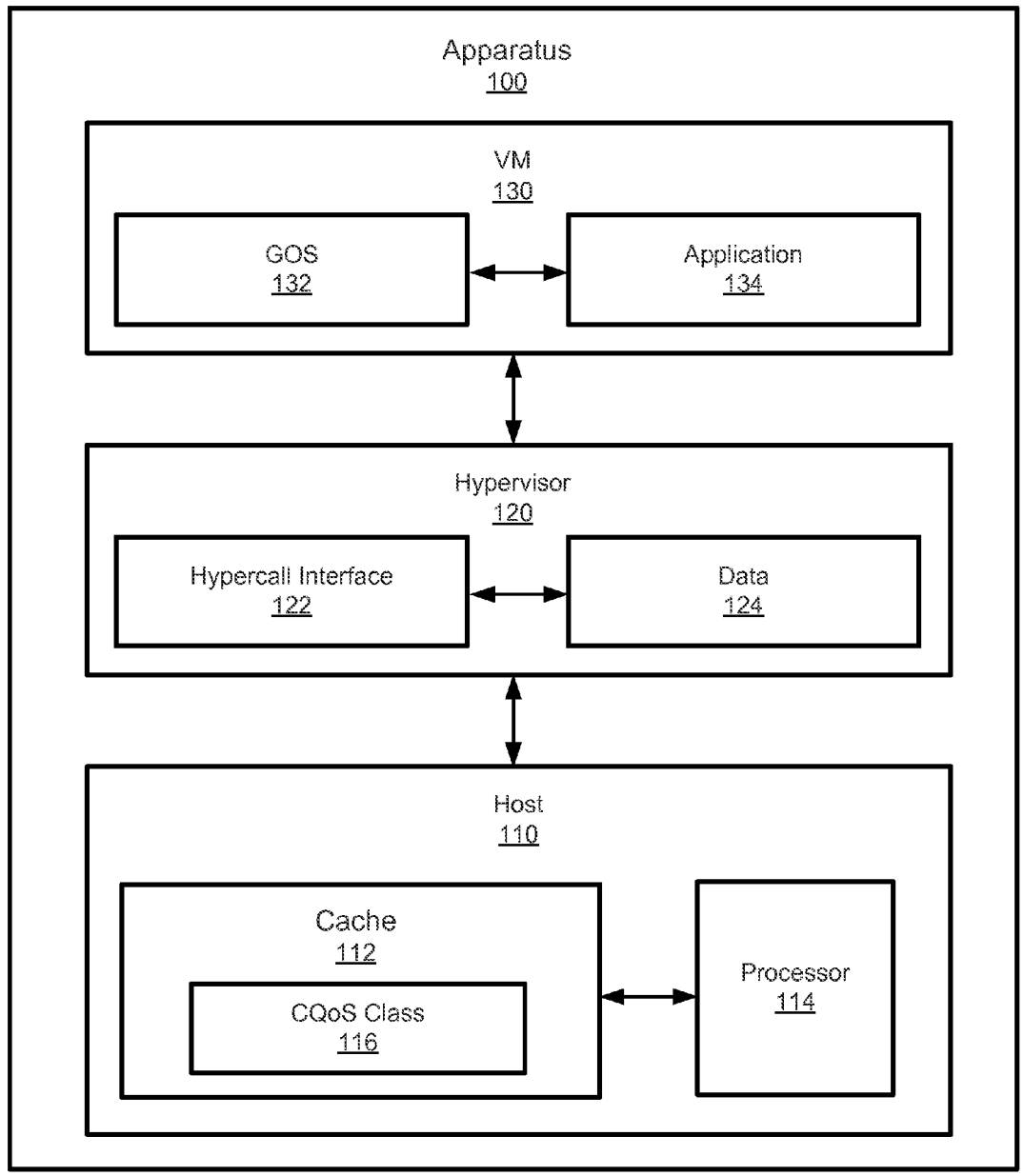
FIG. 1 is a schematic diagram illustrating an example implementation of an apparatus for virtualized computing, incorporating aspects of the present disclosure, in accordance with various embodiments.

Embodiments of apparatuses and methods for virtualized computing are described herein. In embodiments, an apparatus may include one or more processor cores and a cache coupled to the one or more processor cores. Hereinafter, a processor core may be simply referred to as a core. The apparatus may further include a hypervisor operated by the one or more processor cores to manage operations of virtual machines on the apparatus, including selecting a part of the cache to store selected data or code of the hypervisor or one of the virtual machines, and locking the part of the cache to prevent the selected data or code from being evicted from the cache. These and other aspects of this disclosure will be more fully described below.

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

Reference in the description to one embodiment or an embodiment means that a particular feature, structure, or characteristic described in connection with the embodiment is included in at least one embodiment of the invention. The description may use the phrases "in one embodiment," "in an embodiment," "in another embodiment," "in embodiments," "in various embodiments," or the like, which may each refer to one or more of the same or different embodiments. Furthermore, the terms "comprising," "including," "having," and the like, as used with respect to embodiments of the present disclosure, are synonymous.

In embodiments, the term "module" may refer to, be part of, or include an application specific integrated circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. In embodiments, a module may be implemented in firmware, hardware, software, or any combination of firmware, hardware, and software. In embodiments, the term "interface" may refer to a point of interaction with software or computer hardware, including software to software, software to hardware, and hardware to hardware interactions.

Referring now to FIG. 1, an example implementation of an apparatus for virtualized computing, in accordance with various embodiments, is illustrated. As shown, apparatus 100 may include host 110 hosting execution of one or more virtual machines VM 130, under the management of hypervisor 120. In some embodiments, apparatus 100 may be a mobile computing device. In some embodiments, apparatus 100 may be a stationary computing device. In some embodiments, apparatus 100 may be a server suitable for cloud computing. In some embodiments, apparatus 100 may be a distributed system with various components or subsystems distributed at various wearable, mobile, or stationary devices.

In embodiments, apparatus 100 may be suitable for hardware virtualization or platform virtualization in which VM 130 may act like a computer with guest operating system (GOS) 132 being different from the host operating system running on host 110. Hypervisor 120 may be a virtual machine monitor, which may create VM 130 and/or enable VM 130 running on host 110. Hypervisor 120 may be a piece of computer software, firmware, or hardware in various embodiments. Hypervisor 120 may present GOS 132 on VM 130 with a virtual operating platform and manage the operation of VM 130. Application 134 and GOS 132 executed on one VM 130 may share the underlying hardware resources on host 110 with other VMs 130.

In some embodiments, hypervisor 120 may enable full virtualization, which allows the unmodified GOS 132 of VM 130 to run in isolation (from other GOSs 132 of other VMs 130) on host 110. In some embodiments, hypervisor 120 may directly control the hardware of host 110 and act as the mediator between VM 130 and the underlying hardware resources. In some embodiments, hypervisor 120 may run within the native operating system of host 110 with hypervisor 120 as a software layer between VM 130 and the native operating system of host 110.

In embodiments, host 110 may include cache 112 and processor 114. Processor 114 may be a multi-core processor with two or more independent cores. Cache 112 may be a special high-speed storage mechanism for host 110. In some embodiments, cache 112 may include an instruction cache to speed up executable instruction fetch. In some embodiments, cache 112 may include a data cache to speed up data fetch and store. Yet in some embodiments, cache 112 may include a translation lookaside buffer (TLB) used to speed up virtual-to-physical address translation for both executable instructions and data.

In embodiments, cache 112 may be organized with a hierarchy of cache levels, e.g., the first-level cache (L1), the second-level cache (L2), etc., till the last-level cache (LLC) to balance cache latency and hit rate as larger caches have better hit rates but longer latencies. In embodiments, all or some levels of cache 112 may be built into the architecture of processor 114, or sit between processor 114 and the main memory. In embodiments, cache 112 may have specific functions, such as a data cache or instruction cache. In embodiments, cache 112 may be shared among the different cores of processor 114. As an example, each core may have its own instruction or data L1 and shared instruction/data L2, but instruction/data L3 may be shared among all cores.

In embodiments, cache 112 may be configured to support cache quality of service (CQoS) class 116. Each core may be assigned a CQoS class. The various CQoS classes may be used to prioritize access to a shared cache. In embodiments, cache 112 may include a CQoS class to lock stored data in the shared cache. In embodiments, a CQoS class may include a bitmask that controls which ways in the shared cache can be utilized to cache the content of memory locations accessed by a core. In embodiments, data or code locked in a cache may not be evicted. In embodiments, hypervisor 120 may be configured to lock a part of the cache associated with a CQoS class, e.g., by setting up the bitmask of the CQoS class as desired.

In embodiments, hypervisor 120 may select its main dispatch routines, such as a dispatch function, a scheduler, or an interrupt handler, to be stored and locked in cache 112. The interrupt handler may be for root context and/or virtual machine context. In embodiments, GOS 132 may be a real-time guest operating system intended to serve real-time application requests. GOS 132 may select its critical data or code, such as dispatcher, interrupt handling code, etc., to be stored and locked in cache 112. In embodiments, hypervisor 120 may accord itself a higher priority than VM 130 to store and lock data or code to cache 112.

In embodiments, hypervisor 120 may include hypercall interface (HI) 122 and data 124. In embodiments, hypervisor 120 may be operated by processor 114 to manage operations of VM 130, such as selecting a part of cache 112 to store selected data or code of hypervisor 120 (e.g., a part of data 124) or VM 130 (e.g., a part of GOS 132), and locking the part of the cache to prevent the selected data or code from being evicted from cache 112.

In embodiments, HI 122 may enable VM 130 to request privileged operations via hypercalls. In many modern operating systems, such as UNIX, LINUX, Windows or Mac OS X, system calls provide a mechanism for a process executing in less privileged mode to synchronously communicate with operating system services in privileged (or supervisor) mode. Hypercalls provide a similar communication mechanism. In contrast to system calls, which communicate between process space and kernel space within a system, a hypercall allows for communication between a virtual machine and a hypervisor.

In embodiments, a hypercall may be a software trap from VM 130 to hypervisor 120. As an example, GOS 132 may request hypervisor 120 to lock selected data or code of GOS 132 or application 134 to cache 112. As another example, GOS 132 may request hypervisor 120 to unlock selected data or code of GOS 132 or application 134 from cache 112. In embodiments, a hypercall via HI 122 may be synchronous, but the return path from hypervisor 120 to VM 130 may use event channels, which may use a queue of asynchronous notifications.

In some embodiments, GOS 132 may inform hypervisor 120 via a hypercall about certain regions of memory to be locked into cache 112. The hypercall may provide the start address in the guest physical memory address space and the length of the targeted memory region. In some embodiments, GOS 132 may inform hypervisor 120 via a hypercall to disable cache locking of certain memory regions, similarly, by specifying the start address in the guest physical memory address space and the length of the targeted memory region to be unlocked. In some embodiments, GOS 132 may inform hypervisor 120 via a reset hypercall to reset all previous cache locking requests without specifying any particular memory region.

In embodiments, critical data or code of hypervisor 120 or VM 130 may be locked in cache 112. Locked data or code may be prevented from evicting from at least the LLC of cache 112. Locked data or code may also be prevented from evicting from L1 and L2 of cache 112. In some embodiments, the cache locking mechanism via CQoS class 116 may be exercised within hypervisor 120 alone. In embodiments, VM 130 may execute various operating systems and different operating system versions; thus, VM 130 may have different properties for key functions, such as dispatcher, interrupt handling code, etc. The cache locking mechanism via CQoS class 116 may be made known to VM 130, e.g., by hypervisor 120, so that GOS 132 may be enabled to lock its critical data or code into cache 112 via hypercall interface 122 based on the operating requirements and internal structure of VM 130.

In embodiments, apparatus 100 may be implemented differently as depicted in FIG. 1. As an example, cache 112 may be integrated into processor 114. In embodiments, components depicted in FIG. 1 may have a direct or an indirect connection not shown in FIG. 1. In embodiments, some or all components of apparatus 100 may be implemented in hardware or software, or combination thereof, as well as spread across any number of different devices or networks.

Enhanced with the present disclosure, an apparatus may be configured to improve hypervisor performance, including reducing the jitter and worst-case latency. As an example, part or all of dispatch functions or functions invoked by a dispatch function for scheduling in hypervisor 120 may be locked in cache 112 to reduce access latency (e.g., lower jitter) and achieve higher performance. As another example, part or all of hypervisor 120's text or data may be locked in cache 112 to reduce access latency and achieve higher performance.

Enhanced with the present disclosure, an apparatus may be configured to improve separation between two VMs, separation between a VM and a hypervisor, separation between a VM and a host, and real-time performance with a combination of cache locking and workload consolidation under virtualization. A real-time system may have to account for the worst-case VM exit and VM entry latencies and/or jitters. In embodiments, CQoS may be used to prevent data or code residing in certain ways in the cache from being evicted, and a hypervisor may provide its guests an interface to lock their critical data or code in the cache and further prevent all guests from using these dedicated ways by trapping model-specific register (MSR) writes from a guest operating system to an active CQoS class. As an example, the performance of a real-time guest operating system may be improved if parts or all of VM context information, such as virtual machine control structures (VMCS) or general purpose registers, are locked into cache, which results in higher performance due to reduced access latency. As another example, parts or all of VM guests interrupt handlers may be locked in cache to similarly improve real time performance.

Figure 2:
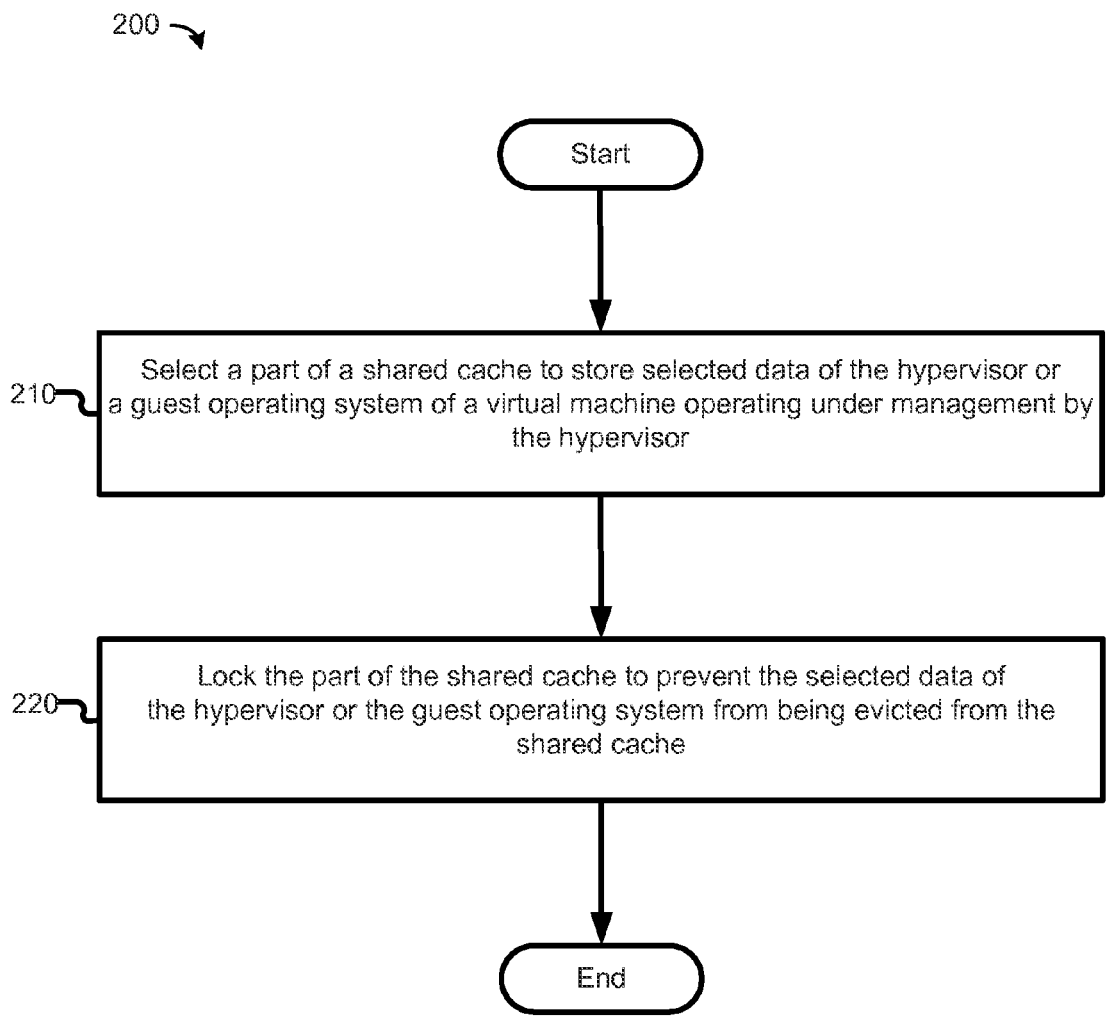
FIG. 2 is a flow diagram of an example process for virtualized computing, which may be practiced by an example apparatus, incorporating aspects of the present disclosure, in accordance with various embodiments.

Referring now to FIG. 2, a flow diagram of an example process 200 for virtualized computing is illustrated. Process 200 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured for virtualized computing. As such, process 200 may be performed by a computing device, e.g., apparatus 100 in connection with FIG. 1, to implement one or more embodiments of the present disclosure. In embodiments, various blocks in FIG. 2 may be combined or arranged in any suitable order, e.g., according to the particular embodiment of apparatus 100 to conduct virtualized computing.

In embodiments, the process may begin at block 210, where a part of a shared cache may be selected to store selected data or code of a hypervisor or a guest operating system of a virtual machine managed by the hypervisor, e.g., by hypervisor 120 in connection with FIG. 1. A hypervisor may select the part of the cache by selecting one or more ways not used by direct data input and output (DDIO), which may write directly to the shared cache from peripheral component interconnect express (PCI Express or PCIe) devices. As discussed in connection with FIG. 1, in embodiments, the hypervisor may determine the size of the selected cache based at least in part on the known or estimated size of its main dispatch routines suitable to be locked in the cache.

Next, at block 220, the part of the shared cache may be locked to prevent the selected data or code of the hypervisor or the guest operating system from being evicted from the shared cache, e.g., by hypervisor 120 in connection with FIG. 1. In embodiments, a hypervisor may fetch into the selected ways in the cache with main dispatch routines of the hypervisor, such as a dispatch function, a scheduler, or an interrupt handler. Then, the hypervisor may lock these selected ways to prevent them from being used in any active CQoS classes associated with the shared cache. In embodiments, a CQoS class may include a bitmask that controls which ways in the shared cache can be accessed by a core. Therefore, the hypervisor may set or reset corresponding bits associated with the selected ways as a locking mechanism.

In embodiments, a guest operating system in a VM may be a real-time or general purpose operating system. The hypervisor may provide its guest operating systems with a hypercall interface, where guest operating systems may request to lock their critical data or code in the cache via the hypercall interface. In some embodiments, the hypervisor may accord itself a higher priority than a guest operating system from a VM to store data or code to the part of the selected cache. Thus, if there are spare ways selected in connection with block 210, the hypervisor may warm up these spare ways to store data or code requested by the guest operating systems. Further, the hypervisor may disable these ways in all active CQoS classes using locking mechanisms as described above. In some embodiments, the hypervisor may accord a higher priority to a particular type of data or code from a particular type of VM, so that the particular type of data or code, e.g., from a real-time operating system, may always have an opportunity to be locked in the cache.

In embodiments, a guest operating system may request the hypervisor, e.g., via a hypercall, to release locking of its data or code in the shared cache, for example, by specifying the start address in the guest physical memory address space and the length of the targeted memory region to be unlocked. In embodiments, a guest operating system may inform the hypervisor, e.g., via a reset hypercall, to remove all locking in the shared cache associated with the guest operating system.

In embodiments, the hypervisor may trap a direct contact from a virtual machine to the cache quality of service class. As an example, a hypervisor may trap all MSR writes to the active CQoS class set to prevent guest operating systems from using CQoS classes reserved in connection with block 210.

Locking selected ways in a shared cache may increase conflict misses caused by reduced numbers of available ways in the shared cache. In embodiments, cache coloring may be used to mitigate the conflict misses. Cache coloring may allocate free pages that are contiguous in the cache to maximize the total number of pages cached by a processor.

Referring now to FIG. 3, it is a schematic diagram illustrating CQoS classes, which may be practiced by an example apparatus in accordance with various embodiments. In embodiments, CQoS classes may be used in reference to block 220 in FIG. 2 or CQoS class 116 in FIG. 1.

In embodiments, CQoS may assign a CQoS class to each core. A CQoS class may be used to prioritize access to a shared cache. A CQoS class may also be used to lock data or code in the shared cache. In embodiments, a CQoS class may include a bitmask that controls which ways in the shared cache can be accessed by a core. As an example, CQoS class 310 allows ways 2 to 11 for core accessing. In connection with FIG. 2, several ways in CQoS class 310 may be selected, warmed up with data or code, and locked. However, in some embodiments, ways 0 and 1 in CQoS class 310 may not be selected as they are used for DDIO. Resultantly, CQoS class 320 demonstrates the CQoS class allowing only ways 10 and 11 for core accessing after locking ways 2 to 9, whose bits have been flipped from 1 to 0. With CQoS class 320, all cores may not be allowed to use these locked ways in the shared cache. The locked data or code may at least stay in the LLC, although the locked data or code may still be evicted by the same core that locked the data or code, e.g., from L1 and L2.

Figure 4:
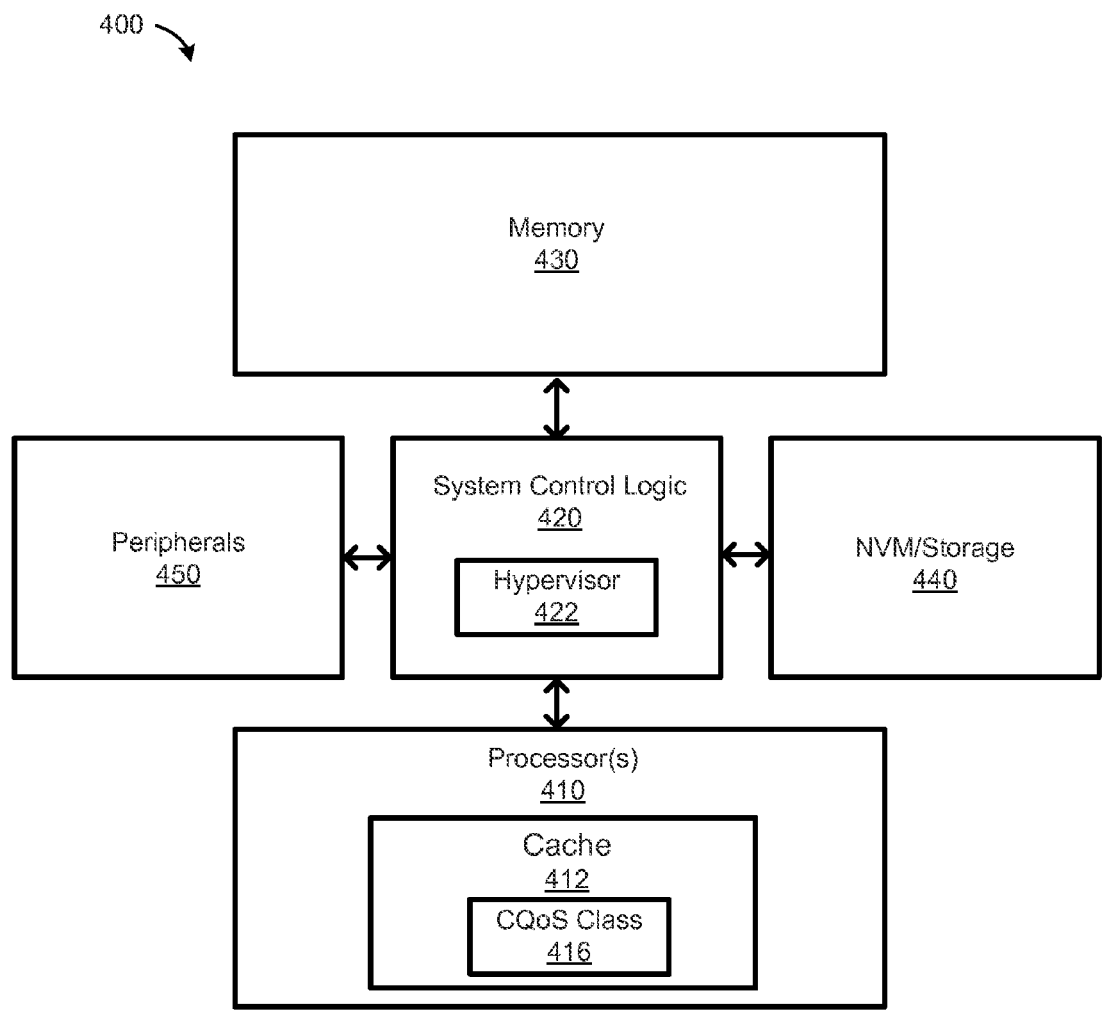
FIG. 4 illustrates an example computing device suitable for practicing the disclosed embodiments, in accordance with various embodiments.

FIG. 4 illustrates an embodiment of a computing device 400 suitable for practicing embodiments of the present disclosure. As illustrated, computing device 400 may include system control logic 420 coupled to one or more processors 410, to memory 430, to non-volatile memory (NVM)/storage 440, and to one or more peripherals 450. In various embodiments, the one or more processors 410 may include one or more processor cores and cache 412. In embodiments, cache 412 may be configured to support CQoS class 416 to lock stored data or code in cache 412. Cache 412 and CQoS class 416 may function similarly to cache 112 and CQoS class 116, respectively, in connection with FIG. 1.

In embodiments, peripherals 450 may include any suitable hardware and/or firmware, such as a network adapter, one or more antennas, wireless interface, and so forth. Peripherals 450 may include a broad range of wired or wireless interfaces, including but not limited to I²C bus, universal serial bus (USB), Bluetooth®, wireless network interface controller (WNIC), and the like. Peripherals 450 may include an interface for computing device 400 to communicate over one or more networks and/or with any other suitable device. In various embodiments, peripherals 450 may include an interface for computing device 400 to use near field communication (NFC), optical communications, or other similar technologies to communicate directly (e.g., without an intermediary) with another device. In various embodiments, peripherals 450 may interoperate with radio communications technologies such as, for example, Wideband Code Division Multiple Access (WCDMA), Global System for Mobile communications (GSM), Long Term Evolution (LTE), WiFi, Bluetooth®, Zigbee, and the like.

In embodiments, system control logic 420 may include any suitable interface controllers to provide for any suitable interface to the processor(s) 410 and/or to any suitable device or component in communication with system control logic 420. In embodiments, system control logic 420 may include hypervisor 422 to manage the operations of one or more VMs running on computing device 400. Hypervisor 422 may function similarly to hypervisor 120 in connection with FIG. 1.

In embodiments, system control logic 420 may also interoperate with a display (not shown) for display of information, such as to a user. In various embodiments, the display may include one of various display formats and forms, such as, for example, liquid-crystal displays, cathode-ray tube displays, e-ink displays, or projection displays. In various embodiments, the display may include a touch screen.

In embodiments, system control logic 420 may include one or more memory controllers (not shown) to provide an interface to system memory 430. System memory 430 may be used to load and store data and/or instructions, for example, for computing device 400. System memory 430 may include any suitable volatile memory, such as suitable dynamic random access memory (DRAM), for example.

In some embodiments, system control logic 420 may include one or more input/output (I/O) controllers (not shown) to provide an interface to NVM/storage 440 and peripherals interface 450. NVM/storage 440 may be used to store data and/or instructions, for example. NVM/storage 440 may include any suitable non-volatile memory, such as flash memory, for example, and/or may include any suitable non-volatile storage devices, such as one or more hard disk drives (HDD), one or more solid-state drives, one or more compact disc (CD) drives, and/or one or more digital versatile disc (DVD) drives, for example. NVM/storage 440 may include a storage resource that is physically part of a device on which computing device 400 is installed on or capable to access, but not necessarily a part of, computing device 400. For example, NVM/storage 440 may be accessed by computing device 400 over a network via communication interface 458.

In embodiments, system memory 430, NVM/storage 440, and system control logic 420 may include, in particular, temporal and persistent copies of hypervisor 422. Hypervisor 422 may include instructions that, when executed by at least one of the processor(s) 410, result in computing device 400 performing virtualized computing, such as, but not limited to, process 200.

In some embodiments, at least one of the processors 410 may be packaged together with memory having system control logic 420 and/or hypervisor 422. In some embodiments, at least one of the processors 410 may be packaged together with memory having system control logic 420 and/or hypervisor 422 to form a System in Package (SiP). In some embodiments, at least one of the processors 410 may be integrated on the same die with memory having system control logic 420 and/or hypervisor 422. In some embodiments, at least one of the processors 410 may be integrated on the same die with memory having system control logic 420 and/or hypervisor 422 to form a System on Chip (SoC).

Depending on which modules of apparatus 100 in connection with FIG. 1 are hosted by computing device 400, the capabilities and/or performance characteristics of processors 410, system memory 430, and so forth, may vary. In various implementations, computing device 400 may be a wearable computing device, a smartphone, a tablet, a mobile computing device, a server, etc., enhanced with the teachings of the present disclosure. In embodiments, the placement of the different modules in FIG. 4 and/or how they are coupled with other modules may be different from what is illustrated in FIG. 4.

Figure 5:
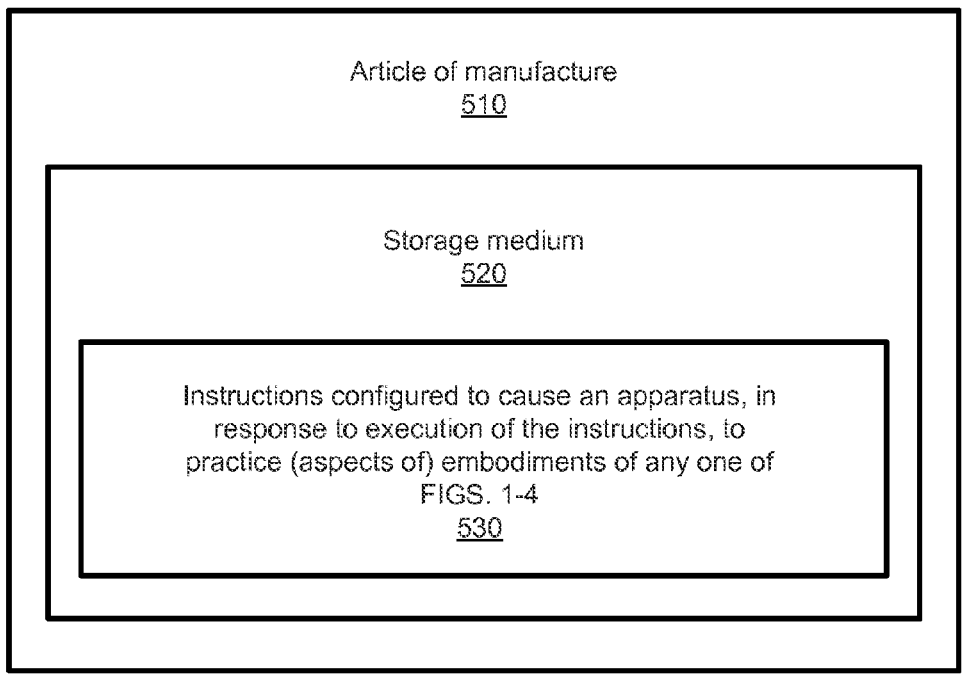
FIG. 5 illustrates an article of manufacture having programming instructions, incorporating aspects of the present disclosure, in accordance with various embodiments.

FIG. 5 illustrates an article of manufacture 510 having programming instructions, incorporating aspects of the present disclosure, in accordance with various embodiments. In various embodiments, an article of manufacture may be employed to implement various embodiments of the present disclosure. As shown, the article of manufacture 510 may include a computer-readable storage medium 520, with instructions 530 are configured to practice embodiments of or aspects of embodiments of any one of the processes described here. The storage medium 520 may represent a broad range of persistent storage media known in the art, including but not limited to flash memory, dynamic random access memory, static random access memory, an optical disk, a magnetic disk, etc. Instructions 530 may enable an apparatus, in response to the apparatus's execution of the instructions, to perform various operations described herein. For example, storage medium 520 may include instructions 530 configured to cause an apparatus, e.g., apparatus 100, to practice some or all aspects of virtualized computing in connection with FIGS. 1-4, e.g., hypervisor 120, in accordance with embodiments of the present disclosure. In embodiments, computer-readable storage medium 520 may include one or more computer-readable non-transitory storage mediums. In other embodiments, computer-readable storage medium 520 may be transitory, such as signals, encoded with instructions 530.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The following paragraphs describe examples of various embodiments.

Example 1 is an apparatus for virtualized computing, which may include one of more processor cores and a cache coupled to the one or more processor cores. The apparatus may also include a hypervisor operated by the one or more processor cores to manage operation of virtual machines on the apparatus, including selecting a part of the cache to store selected data or code of the hypervisor or one of the virtual machines, and locking the part of the cache to prevent the selected data or code from being evicted from the cache.

Example 2 may include the subject matter of Example 1, and may further specify that the hypervisor includes an interface for a guest operating system of the one of the virtual machines to request locking the selected data or code of the guest operating system to the part of the cache.

Example 3 may include the subject matter of Example 2, and may further specify that the guest operating system is a real-time operating system.

Example 4 may include the subject matter of any one of Examples 1-3, and may further specify the hypervisor to accord itself a higher priority than the one of the virtual machines to store data or code to the part of the cache.

Example 5 may include the subject matter of any one of Examples 1-4, and may further specify the hypervisor to select the part of the cache by selecting one or more ways not used by direct data input and output.

Example 6 may include the subject matter of any one of Examples 1-5, and may further specify that the selected data or code from the hypervisor comprises at least one of a dispatch function, a scheduler, or an interrupt handler.

Example 7 may include the subject matter of any one of Examples 1-6, and may further specify that the hypervisor comprises a hypercall interface that includes a hypercall for requesting a region of memory in the one of the virtual machines to be locked into the cache.

Example 8 may include the subject matter of any one of Examples 1-7, and may further specify that the hypervisor comprises a hypercall interface that includes a hypercall for requesting a region of memory in the one of the virtual machines to be unlocked from the cache.

Example 9 may include the subject matter of any one of Examples 1-8, and may further specify that the cache is associated with a cache quality of service class that includes a bitmask to control access to a last-level cache of the cache.

Example 10 may include the subject matter of Example 9, and may further specify the hypervisor to lock the part of the cache through a setting in the cache quality of service class.

Example 11 may include the subject matter of Example 9 or 10, and may further specify the hypervisor to trap a direct contact from the one of the virtual machines to the cache quality of service class.

Example 12 is a method for virtualized computing, which may include selecting, by a hypervisor of a computing system, a part of a shared cache to store selected data or code of the hypervisor or a virtual machine operating on the computer system, under management by the hypervisor; and locking, by the hypervisor, the part of the shared cache to prevent the selected data or code of the hypervisor or the virtual machine from being evicted from the shared cache.

Example 13 may include the subject matter of Example 12, and may further include receiving from a guest operating system of the virtual machine, by the hypervisor, a request to lock the selected data or code of the guest operating system to the part of the shared cache.

Example 14 may include the subject matter of Example 13, and may further specify that receiving comprises receiving, through a hypercall interface, a hypercall requesting a region of virtual memory managed by the guest operating system to be locked into the shared cache.

Example 15 may include the subject matter of Example 13 or 14, and may further include receiving, by the hypervisor, through the hypercall interface, a hypercall requesting a region of virtual memory managed by the guest operating system to be unlocked from the shared cache.

Example 16 may include the subject matter of any one of Examples 13-15, and may further specify that the guest operating system is a real-time operating system.

Example 17 may include the subject matter of any one of Examples 12-16, and may further include according, by the hypervisor, a higher priority to use the part of the shared cache than the virtual machine.

Example 18 may include the subject matter of any one of Examples 12-17, and may further specify that locking comprises disabling the part of the shared cache in a cache quality of service class.

Example 19 may include the subject matter of Example 18, and may further specify that the cache quality of service class comprises a bitmask controlling access to a last-level cache of the shared cache.

Example 20 may include the subject matter of any one of Examples 12-19, and may further specify that locking comprises trapping, by the hypervisor, a direct contact from the virtual machine to a cache quality of service class of the shared cache.

Example 21 may include the subject matter of any one of Examples 12-20, and may further specify that the selected data or code from the hypervisor comprises at least one of a dispatch function, a scheduler, or an interrupt handler.

Example 22 may include the subject matter of any one of Examples 12-21, and may further specify that selecting the part of the shared cache comprises selecting one or more ways not used by direct data input and output.

Example 23 is a computer-readable storage medium having stored therein instructions configured to cause a device, in response to execution of the instructions by the device, to practice the subject matter of any one of Examples 12-22. The storage medium may be non-transient.

Example 24 is an apparatus for virtualized computing, which may include means for selecting, by a hypervisor of a computer system, a part of a shared cache to store selected data or code of the hypervisor or a virtual machine operating on the computer system, under management by the hypervisor; and means for locking, by the hypervisor, the part of the shared cache to prevent the selected data or code of the hypervisor or the virtual machine from being evicted from the shared cache.

Example 25 may include the subject matter of Example 24, and may further include means for receiving from a guest operating system of the virtual machine, by the hypervisor, a request to lock or unlock the selected data or code of the guest operating system at the part of the shared cache.

Example 26 may include the subject matter of Example 24 or 25, and may further include means for trapping, by the hypervisor, a direct contact from the virtual machine to a cache quality of service class of the shared cache.

What is claimed is:

1. An apparatus, comprising:
   one of more processor cores;
   a cache coupled to the one or more processor cores; and
   a hypervisor operated by the one or more processor cores to manage operation of virtual machines on the apparatus, wherein to manage operation of virtual machines on the apparatus the hypervisor is to determine one or more ways of the cache not used by direct data input and output, select the determined one or more ways not used by direct data input and output as a part of the cache to store a selected data or code of a main dispatch routine of the hypervisor or one of the virtual machines, select an amount of the part of the cache based on a known or estimated size of the main dispatch routine, and lock the part of the cache to prevent the selected data or code from being evicted from the cache.

2. The apparatus according to claim 1, wherein the hypervisor includes an interface for a guest operating system of the one of the virtual machines to request that the selected data or code of the guest operating system be locked to the part of the cache.

3. The apparatus according to claim 2, wherein the guest operating system is a real-time operating system.

4. The apparatus according to claim 1, wherein the hypervisor is to accord itself a higher priority than one of the virtual machines to store data or code to the part of the cache.

5. The apparatus according to claim 1, wherein the selected data or code of the main dispatch routine comprises at least one of a dispatch function, a scheduler, or an interrupt handler and wherein the main dispatch routine is for a virtual machine context or a root context.

6. The apparatus according to claim 1, wherein the hypervisor comprises a hypercall interface that includes a hypercall to request a region of memory in one of the virtual machines be locked or unlocked at the cache.

7. The apparatus according to claim 1, wherein the cache is associated with a cache quality of service class that includes a bitmask to control access to the cache.

8. The apparatus according to claim 7, wherein the hypervisor is to lock the part of the cache through a setting in the cache quality of service class.

9. The apparatus according to claim 7, wherein the hypervisor is to trap a direct contact from one of the virtual machines to the cache quality of service class.

10. At least one non-transitory machine readable storage medium having a plurality of instructions configured to enable an apparatus, in response to execution of the plurality of instructions by the apparatus, to be provided with a hypervisor, wherein the hypervisor is to:
    determine one or more ways of a shared cache not used by direct data input and output, select a part of the shared cache corresponding to the determined one or more ways of the shared cache not used by direct data input and output, select an amount of the part of the shared cache based on a known or estimated size of a main dispatch routine to store selected data or code of the main dispatch routine of the hypervisor or a virtual machine operating on the apparatus, under management by the hypervisor; and
    lock the part of the shared cache to prevent the selected data or code of the hypervisor or the virtual machine from being evicted from the shared cache.

11. The storage medium of claim 10, wherein the hypervisor is to further receive from a guest operating system of the virtual machine a request to lock the selected data or code of the guest operating system to the part of the shared cache.

12. The storage medium of claim 11, wherein the request is made through a hypercall interface of the hypervisor and comprises a hypercall request to lock a region of virtual memory managed by the guest operating system in the shared cache.

13. The storage medium of claim 11, wherein the guest operating system is a real-time operating system.

14. The storage medium of claim 10, wherein the hypervisor is to receive from a guest operating system of the virtual machine a request to unlock the selected data or code of the virtual machine from the part of the shared cache.

15. The storage medium of claim 14, wherein the request is made through a hypercall interface of the hypervisor and comprises a hypercall request to unlock a region of virtual memory managed by the guest operating system in the shared cache.

16. The storage medium of claim 10, wherein the hypervisor is to accord the hypervisor a higher priority than the virtual machine to store data or code in the part of the shared cache.

17. The storage medium of claim 10, wherein the selected data or code of the main dispatch routine from the hypervisor comprises at least one of a dispatch function, a scheduler, or an interrupt handler and wherein the main dispatch routine is for a virtual machine context or a root context.

18. The storage medium of claim 10, wherein the hypervisor is to disable the part of the shared cache in a cache quality of service class associated with the shared cache.

19. The storage medium of claim 18, wherein the cache quality of service class comprises a bitmask controlling access to the shared cache.

20. The storage medium of claim 10, wherein the hypervisor is to trap a direct contact from the virtual machine to a cache quality of service class of the shared cache to the hypervisor.

21. A method, comprising:
  determining by a hypervisor of a computer system, one or more ways of a shared cache not used by direct data input and output;
  selecting, by the hypervisor, a part of the shared cache in the determined one or more ways of the shared cache not used by direct data input and output;
  selecting an amount of the part of the shared cached based on a known or estimated size of a main dispatch routine to store selected data or code of the main dispatch routine of the hypervisor or a virtual machine operating on the computer system, under management by the hypervisor; and
  locking, by the hypervisor, the part of the shared cache to prevent the selected data or code of the hypervisor or the virtual machine from being evicted from the part of the shared cache.

22. The method of claim 21, further comprising:
  receiving from a guest operating system of the virtual machine, by the hypervisor, a hypercall to lock or unlock the selected data or code of the guest operating system in the part of the shared cache and wherein the main dispatch routine is for a virtual machine context or a root context.

23. The method of claim 21, further comprising disabling the part of the shared cache in a cache quality of service class with a bitmask controlling access to the shared cache.

* * * * *

UNITED STATES PATENT AND TRADEMARK OFFICE
CERTIFICATE OF CORRECTION

PATENT NO. : 9,652,270 B2
APPLICATION NO. : 14/222416
DATED : May 16, 2017
INVENTOR(S) : Alexander Komarov et al.

It is certified that error appears in the above-identified patent and that said Letters Patent is hereby corrected as shown below:

In the Claims

Column 13
Line 16, "...cached..." should read – ...cache... –

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*